March 24, 1964  W. E. STIPE  3,126,335
WATER SOFTENER
Filed Oct. 28, 1960  4 Sheets-Sheet 3
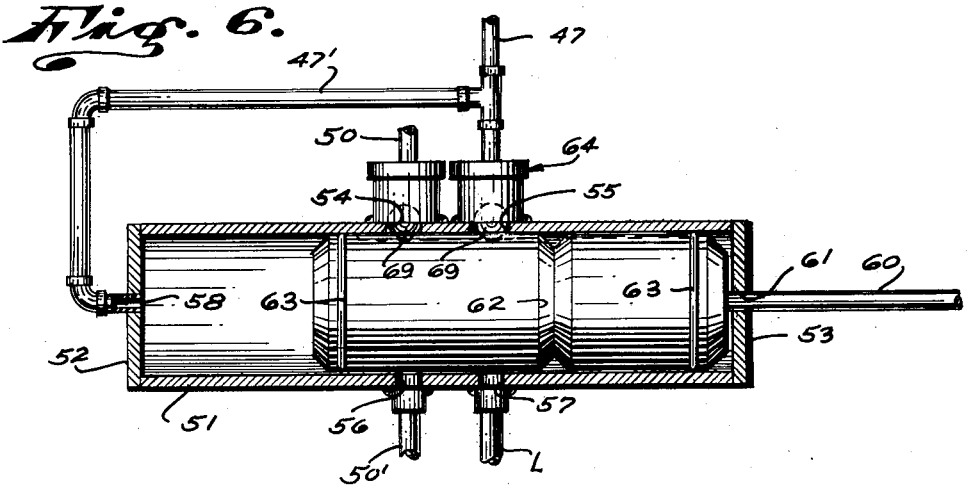
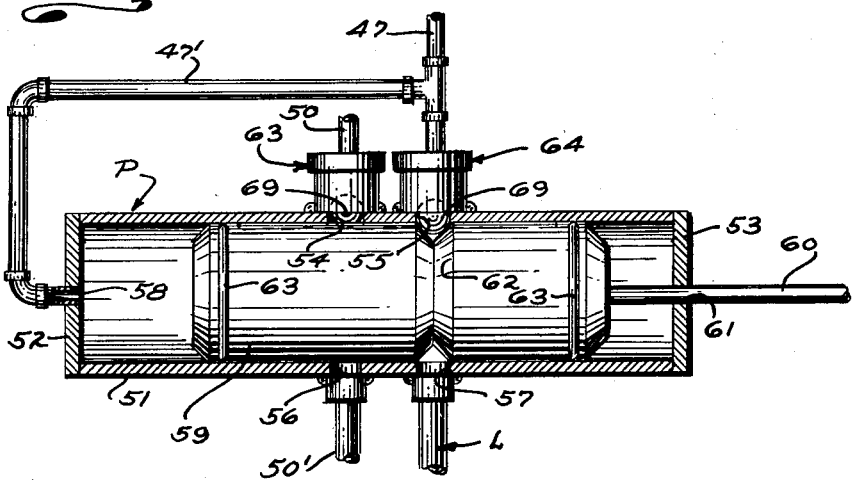
INVENTOR.
WESLEY E. STIPE
BY
Agent March 24, 1964 W. E. STIPE 3,126,335
WATER SOFTENER
Filed Oct. 28, 1960 4 Sheets-Sheet 4

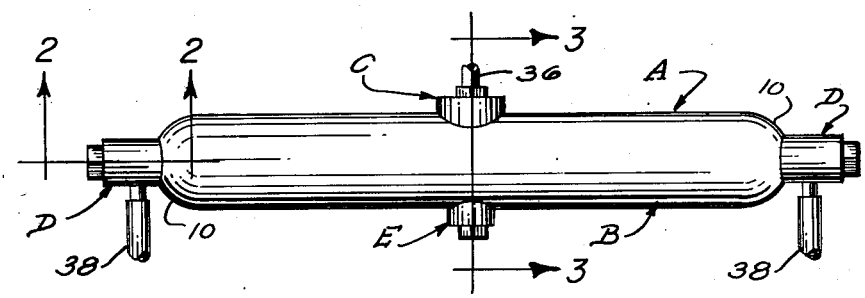
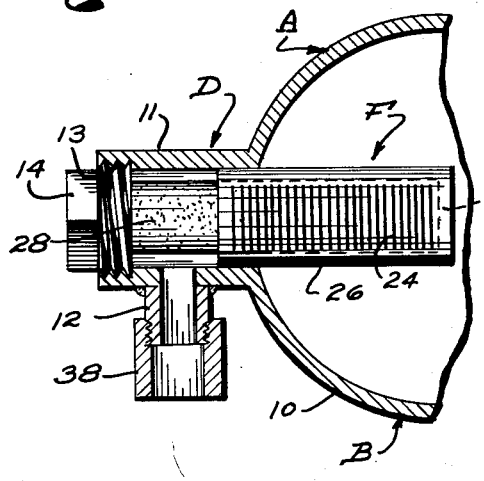
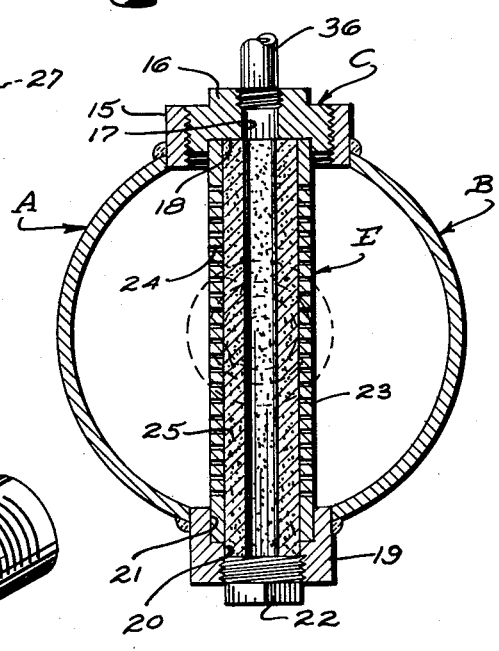
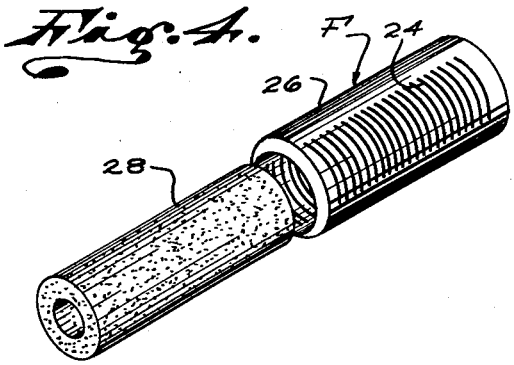
INVENTOR.
WESLEY E. STIPE
BY
Agent

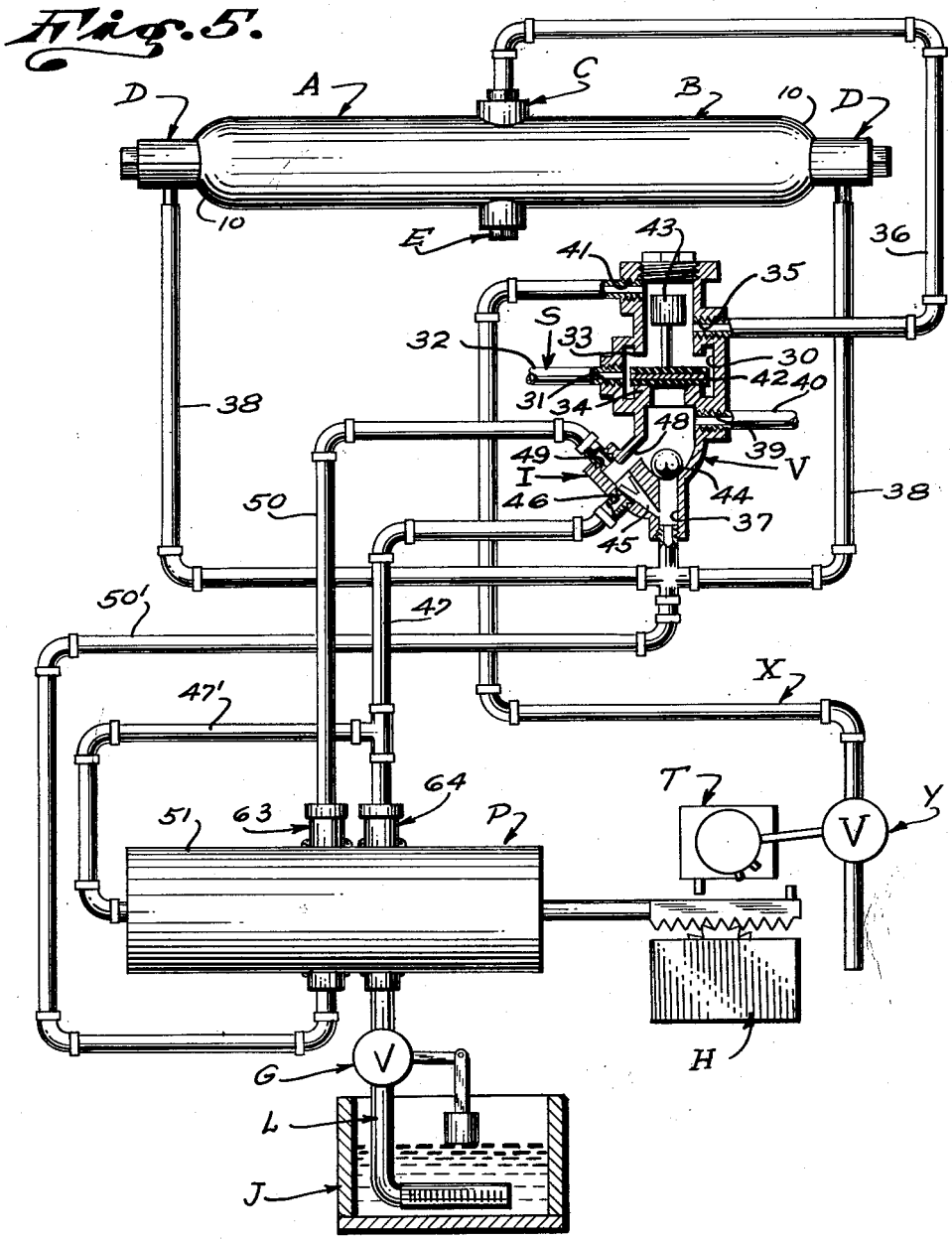

INVENTOR.
WESLEY E. STIPE
BY
George A. Maxwell
Agent

United States Patent Office 3,126,335
Patented Mar. 24, 1964

3,126,335
WATER SOFTENER
Wesley E. Stipe, 1600 Industrial Road, Las Vegas, Nev., assignor of one-third to Walter H. Bell and one-third to Jack C. Wollenzien, Las Vegas, Nev.
Filed Oct. 28, 1960, Ser. No. 65,786
4 Claims. (Cl. 210—126)

This invention relates to a water softener and is more particularly concerned with an improved water softener construction and control means therefor.

The ordinary water softener, most frequently found in domestic and commercial use, involves an elongate, vertically disposed tank having an inlet opening at its upper end to connect with a water supply pipe and receive raw calciumladen, hard water, and an outlet opening at its lower or bottom end to connect with a delivery pipe, through which soft water flows. The tank is provided in its lower end portion with a bed of gravel and the remainder is filled a filler of granular zeolite or resin beads, charged with sodium ions. As raw water flows downwardly through the filler in the tank, there occurs an ion exchange between the calcium in the water and the sodium-charged filler, with the result that the water flowing from the outlet end of the softener is sodium-laden and soft.

After a certain amount of hard water is softened in the manner set forth above, the filler loses its sodium charge and becomes calcium-charged. When this takes places, it is necessary to recharge the filler with sodium. This is accomplished by shutting off normal flow of water through the softener and introducing salted or sodium-saturated water, i.e. salt brine. The presence of the brine brings about a rapid ion exchange which recharges the filler with sodium, whereupon normal flow and softening of hard water can be resumed.

The gravel bed normally provided in such softener serves to prevent the filler from washing through the construction.

The brine used in recharging is generally circulated upwardly through the tank and the gravel filler therein, so that it serves to back-wash and clean out foreign matter collected in the gravel and filler.

In practice, and so that an adequate or sufficient volume of water can be handled, with a minimum allowable back pressure, the ordinary softener tank must be of considerable vertical or longitudinal extent and of considerable diametric extent. The two above-mentioned dimensions materially affect functioning and operating of water softeners. The greater the vertical and diametric extent of a water softener tank, the greater is the tendency for the water flowing therethrough to establish flow patterns through the filler and in such a manner that portions of the filler are not utilized to their full advantage and other portions thereof are overworked, with the result that the softeners do not function uniformly or efficiently.

Also, the larger the filler, the longer it is in service and the greater the volume of water it must handle to be operated effieciently between charges. This has several adverse effects, one being that more sediment and foreign matter is collected and penetrates deeper into the filler. This requires that when the filler is recharged and flushed, a reverse flow must be continued over a prolonged period of time, in order to properly wash and flush out the foreign matter. Since the filler is subject to being washed out of the tank, the back wash must be extremely slow. Accordingly, the ordinary water softener, while not requiring frequent recharging, requires that it be put out of service a considerable period of time when recharging is required. Seldom subjecting these constructions to a reverse flow a sufficient period of time to adequately flush and clean the fillers results in the fillers and gravel beds eventually becoming loaded and congested with foreign matter, which has material adverse effects.

Various automatic controls for back-washing and recharging water softeners have been provided. However, each has one or more serious shortcomings, is costly and complicated to manufacture, and is not dependable. Each, to applicant's knowledge, employs the use of electricity in the valving means and/or in the timing means employed, with the accompanying problem of electrolysis. Further, due to the nature of the ordinary softener, the automatic operating or control means is operated at infrequent intervals and must operate slowly during the prolonged recharging cycle, with the result that the various working components are subject to being oxidized and plugged.

An object of my invention is to provide a novel water softener construction including an elongate horizontally disposed tank of limited longitudinal and diametric extent.

A further object of this invention is to provide a water softener of the character referred to, wherein raw water is introduced into the tank at the center thereof, flows longitudinally outwardly therein, and is discharged at both ends thereof.

It is another object to provide a water softener of the character referred to having a novel filter means at its single inlet, and two outlets whereby the filler is not subject to being packed with foreign matter or flushed out of the construction.

Still another object of this invention is to provide a softener of the character referred to having a tank of minimum diametric extent whereby the tendency for the water flowing through the filler to establish undesirable flow patterns is substantially eliminated.

It is an object of my invention to provide a horizontally disposed tank of the character referred to so that the filler is not subject to settling and packing in the tank, as by the weight of gravity, which in the ordinary tank tends to cause breaking down of the filter and the blocking of free flow of water through the construction.

An object of my invention is to provide a water softener of the character referred to of relatively small capacity, which is such that it can be recharged and flushed in an extremely short period of time.

Another object of this invention is to provide a novel, highly effective and dependable hydraulic and pneumatic operating means to recharge and flush the filter that I provide.

Still another object of this invention is to provide an operating means of the character referred to having a mechanical timing means.

The various objects and features of my invention will be fully understood from the following detailed description of a typical preferred form and application of my invention, throughout which description reference is made to the accompanying drawings, in which:

FIG. 1 is a side elevational view of my new water softener;

FIG. 2 is a sectional view taken as indicated by line 2—2 on FIG. 1;

FIG. 3 is a sectional view taken as indicated by line 3—3 on FIG. 2;

FIG. 4 is an exploded perspective view of one of the filters provided by the invention;

FIG. 5 is a diagrammatic view of the operating means that I provide, showing the relationship to my new softener;

FIG. 6 is an enlarged sectional view of a portion of the structure shown in FIG. 5;

FIG. 7 is a view similar to FIG. 6 showing the structure in a different position;

Figure 8:
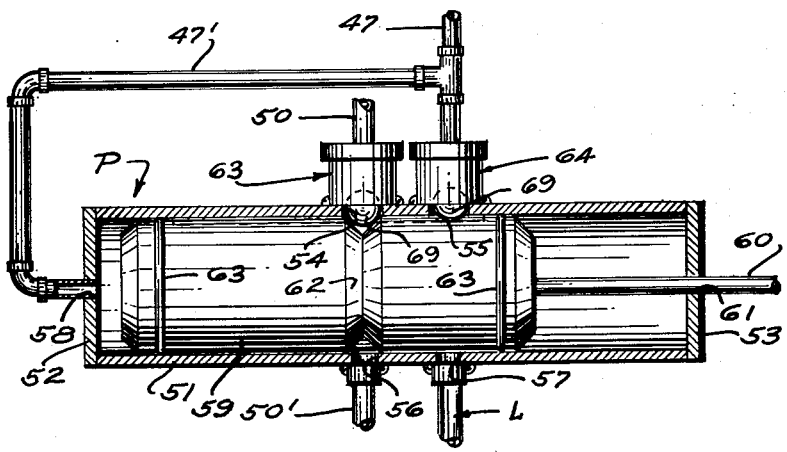
FIG. 8 is a view similar to FIGS. 6 and 7, showing the structure in another position.
Figure 9:
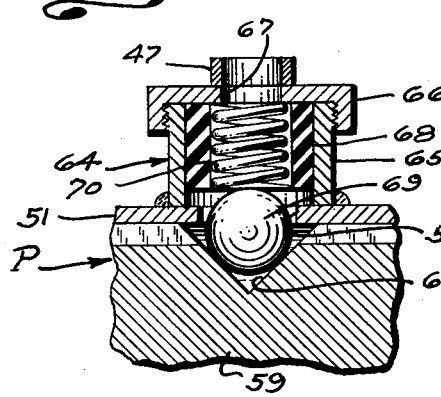
FIG. 9 is an enlarged detailed sectional view of a valve provided by this invention.
Figure 10:
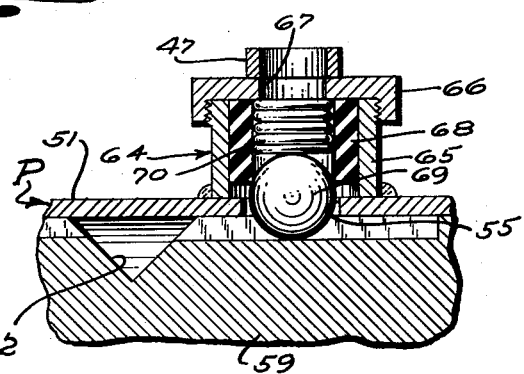
FIG. 10 is a view similar to FIG. 9 showing the valve in a different position.
Figure 11:
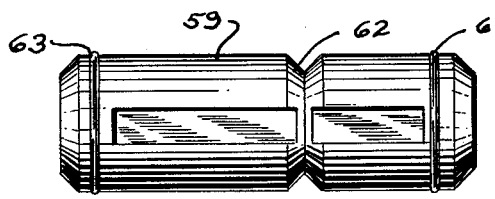
FIG. 11 is an elevational view of a portion of the structure shown in FIG. 6.

The water softener A that I provide, which is illustrated in FIGS. 1 through 4 of the drawings, includes, generally, an elongate, horizontally disposed tubular body B, inlet fittings C intermediate the ends of the body, like outlet fittings D at the opposite ends of the body, filter means E related to the inlet fittings and like filter means F related to the outlet fittings D.

The body B is a straight, tubular steel part, and in the case illustrated has radially inwardly turned end portions 10.

The outlet fittings D at the ends of the body include central, longitudinally outwardly extending tubular extensions 11 projecting from the end portions 10 and in communication with the interior of the body, laterally projecting Ts 12 intermediate the ends of the extensions, which Ts are suitably threaded and connected with delivery lines 38 of the operating means, as will be hereinafter described.

The outer ends of the extensions 11 are internally threaded as at 13, and are closed by suitable screw plugs 14.

The inlet fitting C includes an internally threaded tube 15 entering the body at one side thereof and intermediate its ends, a plug 16 threadedly engaged in the tube 15 and having a central threaded port 17 in which the supply line of the operating means is engaged, as will hereinafter be described. The inner end of the plug 16 is provided with an enlarged bore 18 concentric with the port 17 and which cooperatively receives a part of the filter E, as will hereinafter be described.

The filter E related to the inlet C includes a block 19 entering and fixed to the body opposite the inlet fitting C. The block 19 is provided with a central opening 20, an enlarged bore 21 opening radially inwardly to oppose the bore 18 in the plug 16 of the inlet fitting C, and concentric with the opening 20, and a plug 22 engaged in the opening 20 from the outer end thereof and closing the block. An elongate tubular cage 23 is arranged in the body B to extend transversely thereof, with its ends slidably engaged in the opposing bores 18 and 21 in the plug 16 and block 19, and seated on the bottom of the said bores. The cage 23 can be established of screen, perforated sheet metal, or plastic, or can, as illustrated, be a simple length of plastic or metal tube stock provided with a plurality of longitudinally spaced circumferential slot-like openings 24. An elongate tubular filter unit 25 of activated charcoal, sintered bronze, ceramic or other suitable filter material corresponding in longitudinal extent with the cage, corresponding in outside diameter with the inside diameter of the cage, and having a central bore as large as, or larger than, the port 17 in the plug 16 of the inlet fitting, is slidably engaged in the cage 23, as clearly illustrated in FIG. 3 of the drawings.

The filters F related to the outlet fittings D are alike, and each includes an elongate horizontally disposed tubular cage 26, similar to the cage 23 of the filter E, arranged within the body to extend longitudinally thereof and having an outer end slidably engaged in the inner end of the extension 11 of the outlet fitting D with which it is related, and fixed therein as by solder or cement, and having a closure plate 27 engaged in and closing its innermost end.

Each filter F further includes an elongate tubular filter unit 28 similar to the filter unit 25, but longer than the cage 26 with which it is related. The filter unit 28 is slidably engaged in the cage so as to seat on the bottom thereof, established by the closure plate 27, and projects longitudinally outwardly therefrom into the extension 11 of the fittings D, where its outer end is engaged and closed by the plug 13 of the said fitting.

The body B is completely filled with a filler of zeolite or resin beads (not shown) which occurs about the several cages 26 and 23.

With the softener construction set forth above, it will be apparent that raw water introduced through the inlet fitting C flows through the filter E into the interior of the body. The raw water thus introduced into the body flows longitudinally from the center of the body toward the opposite ends thereof and through the filler therein, during which flow the desired ion exchange, or softening of the water, takes place. Upon reaching the ends of the body, the softened water flows into and through the filters F and thence outwardly through the outlet fittings D.

When the filter is being back-washed and recharged, a flow of brine, in reverse to the flow set forth above, is established. It will be noticed that during the reverse flow the brine is suitably filtered so that during recharging the filler is not subject to being contaminated with foreign matter in the brine.

In the preferred carrying out of the invention, the filter units are formed by activated charcoal. The filter E is primarily intended to remove foreign matter and large particles from the water, and the filters F, through which the previously filtered and softened water flows, serve to sweeten and purify the water by removing harmful and odiferous substances, such as sulphur and chlorine, from the water.

The cages of the filter serve the additional and important function of preventing the filler from being washed through the construction during normal flow, and during the recharging cycle when a reverse flow is established.

The automatic operating means that I provide, and which is illustrated diagrammatically in FIG. 5 of the drawings, includes, generally, a flow control valve V engaged in a water system S and connected with the softener A, a pilot valve P connected with the control valve, a brine tank J, a brine line L related to the pilot valve P and extending to the brine tank, and a suction line extending between the valve P and an injector I in the valve V, a float controlled valve G in the brine line downstream of the valve P, a drain pipe X connected with the valve V, a drain valve Y in the drain line, timing means T to open and close the drain valve, and an escapement H related to and controlling the rate of operation of the inlet valve.

The flow control valve V is a conventional flow-reversing valve such as is commonly employed in connection with water softeners and which includes an injector I to facilitate the introduction of brine into the softener with which the valve is related.

The valve V illustrated is an elongate vertically disposed structure having an inlet chamber 30 with a lateral inlet port 31 connected with a water supply pipe 32 of the water system S and having upper and lower axially disposed annular seats 33 and 34 occurring above and below the ports 31, an outlet port 35 communicating with the chamber 30 above the upper seat 33 and connected with an outlet pipe 36, which pipe extends to and connects with the inlet fitting C of the softener A, a return port 37 entering the lower end of the valve to communicate with the chamber 30 below the lower seat 34 and connected with return pipes 38 extending from the outlet fittings D of the softener A, and a delivery port 39 communicating with the chamber 30 below the lower seat 34 and connected with a delivery pipe 40 of the water system S. The valve V further includes a drain port 41 connected with the chamber 30 above the upper seat 33 and port 35 and connected with the drain pipe X, a vertically shiftable disc-shaped valve member 42 in the chamber between the seats 33 and 34 and normally engaged on the lower seat 34 to establish communication between the inlet and outlet ports 31 and 35 and shut off communication between the said inlet port and the return and delivery ports 37 and 39, and shiftable upwardly to engage the upper seat shutting off communication between the inlet port and the return ports and delivery ports.

The valve member 42 has a central vertical stem projecting upwardly therefrom and which carries an enlargement 43 which occurs in and substantially occupies the upper portion of the chamber 30, above the outlet ports 35. The enlargement 43 is so disposed in the chamber that when the drain valve Y is open, so as to allow for the free flow of fluid therethrough, the upward flow of fluid in the chamber and out through the port 41 urges the enlargement upwardly, thereby shifting the valve member upwardly from its normal down position and into its up or actuated position, where it seats in the upper seat 33.

The injector I related to the valve V includes a ball check valve 44 in the valve body above the return port 37, a venturi type nozzle 45 communicating with the port 37 below the check valve 44, a suction port 46 communicating with the nozzle, a suction pipe 47 connected with the port 46 and related to the valve P and brine line L, and a flow passage 48 between the nozzle and the chamber 30 of the valve B above the check valve 44.

The ejector portion of the valve V is further provided with an auxiliary port 49 to which is connected an auxiliary flow pipe 50 extending from the pilot valve P and through which rinse water is conducted, following the introduction of brine through the construction.

The valve V with the injector I related thereto can vary widely in form and construction without adversely affecting the invention and, accordingly, has been illustrated and described in a schematic and general manner.

The pilot valve P that I provide involves an elongate horizontally disposed cylindrical barrel 51 having front and rear ends closed by heads 52 and 53. The barrel 51 is provided with a pair of longitudinally spaced ports 54 and 55 at one side thereof, a pair of longitudinally spaced ports 56 and 57 at the other side thereof and diametrically opposed to the ports 54 and 55, respectively, and a port 58 in the head 52 at the front end of the barrel. An elongate, longitudinally shiftable piston type valve member 59 is slidably engaged in the barrel to shift longitudinally therein. The valve member 59 is provided with an elongate rod 60 projecting from the rearmost end, which rod projects longitudinally outwardly through an opening 61 in the rearmost head 53 of the barrel. The member 59 is further provided with an annular, radially outwardly opening flow channel 62 intermediate its ends and an annular sealing ring 63 at each end to seal with the bore in the barrel.

The member 63 is adapted to be shifted longitudinally in the barrel so as to overlie the ports 54 through 57 therein, and to selectively shift the groove 62 into and out of register with the ports 54 and 55 or the ports 56 and 57, and establish communication therebetween.

The valve P further includes a pair of like check valves 63 and 64 related to the ports 54 and 55. The valves 63 and 64 each include a cylindrical body 65 fixed to the exterior of the barrel to occur about the port with which it is related, a cap 66 with a control port 67 closing the outer end of the body, a resilient, rubber sleeve-like valve seat 68 in the body, abutting the cap, a ball check or member 69 arranged in the body to normally engage with the inner end of the seat and projecting through the port in the barrel and engaging the valve member 59, and a compression spring 70 between the cap and the ball to normally yieldingly urge the ball away from the seat and into engagement with the valve member 59. When the flow channel 62 into the member 59 is shifted into register with the port in the barrel with which each valve 63 and 64 is related, the ball thereof is urged out of engagement with the seat and into the channel, thereby opening the check valve.

The valve 63 related to the port 54 in the barrel connects with the flow pipe 50 which extends from the auxiliary port 49 of the injector I. The port 56 connects with a fast rinse pipe extending to the return port 37 of the valve V. The valve 64 related to the port 55 in the barrel connects with suction line 47 extending from the port 46 of the injector and the port 57 connects with the brine line L extending from the brine tank J. The port 58 in the head 52 connects with a suction by-pass pipe 47' connected with the suction pipe 50.

The drain valve Y in the drain line X is normally closed, the float valve G in the brine line L is normally closed by virtue of a high level of brine in the tank J, and the valve member 59 of the valve P is normally in the rearmost end of the barrel, as shown in FIG. 6, where the channel 62 is out of register with the ports 54 and 55 and where the check valves 63 and 64 are closed.

The timing means T, illustrated diagrammatically in FIG. 5 of the drawings, is a spring wound clock mechanism and is operatively connected with the drain valve Y to open said valve at predetermined intervals for a predetermined period of time.

In practice, the timing means T is connected to the rod 60 of the valve P so that each time the valve member 59 is shifted longitudinally in the barrel 51 and the rod is shifted, the clock motor is wound tight.

The escapement H, diagrammatically illustrated in FIG. 5 of the drawings, is connected with the rod 60 of the valve P and serves to limit and control the rate at which the valve member 59 can shift in the barrel 51. The escapement H can be of any substantial form and construction. For instance, it could include a suitable governed gear train engaging a suitable rack on the rod 60, or, if desired, a pneumatic or hydraulic cylinder and piston unit, having flow means or the like, to control the rate at which the piston can travel, can be connected with the rod 60 to serve the same purpose as an escapement.

In operation, when the drain valve Y is closed, water in the pipe 32 is introduced into the valve V through the port 31, flows through the valve V, out through the port 35, through the pipe 36 and into the softener A through the inlet fitting C. Then the water flows from the outlet fittings D of the softener A, through the pipes 38, back into the valve V through the return port 37, and thence out through the port 39 and into the pipe 40 of the water system S for subsequent use and/or consumption.

When it is time for recharging the softener, the timing means T opens the drain valve Y. This allows water in the upper portion of the valve V to flow outwardly through the port 41 of the valve V and through the drain pipe X. The upward flow in the valve urges the valve member 42 of the valve V upwardly. This shuts off communication between the ports 31 and 35–41, and establishes communication between the ports 31 and 39. When this takes place, the check valve 44 in the valve V closes the port 37 and a portion of the water flows directly out through the port 39 and into the system S, leaving it in service, and a portion of the water flows through the passage 48 in the valve V, through the injector I and into the port 37, below the check valve 44, and thence through the pipes 38 and into the softener A through the fittings D. A reverse flow of water in the softener is discharged through the fittings C into the pipe 36, flows back into the valve V through the port 38, thence outwardly through the port 41 into the drain line X from which it is discharged.

During the reverse flow set forth in the preceding paragraph, a vacuum or minus pressure is established in the injector I at the port 46, thereby establishing a minus pressure in the suction pipe 47. The by-pass pipe 47' establishing communication between the pipe 47 and the forward end of the barrel of the valve P results in the establishment of a minus pressure in the forward end of the barrel, which draws the valve member 59 forwardly, against the resistance of the escapement H, and from the position shown in FIG. 7 where the check valve 64 is open and communication is established between the ports 55 and 57. When this takes place, the brine in the tank J is drawn upwardly through the pipes L and 47, through the injector I, and is introduced into the water flowing through the softener A. At the same time, the vacuum or minus pressure is released in the forward end of the barrel so that the valve member stops its forward movement. When the level of the brine in the tank J drops to a predetermined level, the valve G closes. This increases the vacuum in the forward end of the barrel and shifts the valve member forwardly to the position shown in FIG. 8, where the check valve 64 is closed, the check valve 63 is opened, and communication is established between the ports 54 and 56. With communication between the ports 54 and 56 established, supplementary water flow is established through the pipes 50 and 50', which flow is introduced into the pipes 38 and thence through the softener to follow the brine and to flush and rinse the brine from the softener. During the rinse cycle water ceases to flow through the nozzle, thereby eliminating the suction in the pipes 47 and 47' and in the barrel, with the result that the valve member stops, until the timing means T closes the drain valve Y.

During forward movement of the valve member 59 the clock motor of the timing means T is rewound, as indicated above.

When the drain valve Y closes, the upward flow through the valve V, past the enlargement 43 and outward through the port 41, is terminated, allowing the valve member 42 to drop to its lower or normal position, as shown in FIG. 5. When this takes place, normal flow is established through the softener A, and hydrant pressure is established in the pipe 47 and 47' and in the forward end of the barrel of valve P which urges the valve member 49 rearwardly, against the resistance of the escapement H, and to its normal position, as shown in FIG. 6. As the valve member 49 returns to its normal position, it passes through the position shown in FIG. 7, where the check valve 64 is open and communication is established between the suction pipe and the brine line. When in this position, water flows back through the float valve G, past the valve member therein, through the brine line L and into the tank J, until a predetermined water level is established, whereupon the float valve G closes and remains closed until a suction is again established at the downstream side of the said valve.

It will be apparent that, in practice, the filter units 25 and 28 can, upon becoming loaded or, in the case of activated carbon filter, saturated, be easily and conveniently replaced by simply removing the plugs 22 and 14 of the filter E and fittings D, respectively.

From the foregoing it will be apparent that I have invented a novel, highly effective, water softener construction, and a novel, highly effective and dependable means for automatically recharging the said water softener.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A water softener of the character referred to including, an elongate horizontally disposed tubular body, an inlet fitting in the body intermediate its ends, like outlet fittings at the opposite ends of the body and a sodium ion charged filler in the body, a flow control valve having inlet and outlet ports connected with supply and delivery pipes of a water system, outlet and return ports and a drain port, an outlet pipe extending between and connected with the outlet port and the inlet fitting, return pipes extending between and connected with the return port and the outlet fittings, a drain pipe connected with the drain port, said outlet and drain ports and said delivery and return ports being in communication, a shiftable valve member in the valve normally establishing communication between the inlet port and the outlet and drain ports and shutting off communication between the inlet port and the delivery and return ports and shiftable to shut off communication between the inlet port and the outlet and drain ports and establish communication between the inlet port and the return and delivery ports, and a normally closed drain valve in the drain pipe, timing means operatively connected with the drain valve to intermittently open and close the said drain valve and effect operation of the control valve and reversal of flow through the softener, and means for first introducing brine into the softener and subsequently introducing rinse water through the softener when the flow control valve is actuated including, an injector related to the flow control valve, a brine tank, and a pilot valve, said injector including a check valve related to the return port to check reverse flow through said port, a venturi nozzle communicating with the return port upstream of the check valve, a suction port communicating with the nozzle, a flow passage between the control valve and the nozzle, and a rinse port communicating with the flow passage, said pilot valve including an elongate barrel with front and rear ends, a ported head closing the front end and longitudinally spaced front and rear pairs of laterally opening ports, a longitudinally shiftable valve member in the barrel normally positioned in the rear portion of the barrel and closing the lateral ports and having an annular flow channel adapted to establish communication between the ports of each pair of ports upon forward longitudinal movement of the valve member in the barrel, a suction line extending between the suction port and one of the rear ports, a brine pipe extending between the other rear port and the brine tank and having a normally open float control valve therein responsive to the level of brine in the tank, and a suction branch pipe connected with and extending between the forward end of the barrel and the suction line, whereby minus pressure is established in the forward end of the barrel to urge the valve member therein forwardly, a rinse pipe connected with and extending between the rinse port and one of the front ports and a rinse line extending between and connected with the other front port and the return pipes.

2. A water softener of the character referred to including, an elongate horizontally disposed tubular body, an inlet fitting in the body intermediate its ends, like outlet fittings at the opposite ends of the body and a sodium ion charged filler in the body, a flow control valve having inlet and outlet ports connected with supply and delivery pipes of a water system, outlet and return ports and a drain port, an outlet pipe extending between and connected with the outlet port and the inlet fitting, return pipes extending between and connected with the return port and the outlet fittings, a drain pipe connected with the drain port, said outlet and drain ports and said delivery and return ports being in communication, a shiftable valve member in the valve normally establishing communication between the inlet port and the outlet and drain ports and shutting off communication between the inlet port and the delivery and return ports and shiftable to shut off communication between the inlet port and the outlet and drain ports and establish communication between the inlet port and the return and delivery ports, and a normally closed drain valve in the drain pipe, timing means operatively connected with the drain valve to intermittently open and close the said drain valve and effect operation of the control valve and reversal of flow through the softener, and means for first introducing brine into the softener and subsequently introducing rinse water through the softener when the flow control valve is actuated including, an injector related to the flow control valve, a brine tank, and a pilot valve, said injector including a check valve related to the return port to check reverse flow through said port, a venturi nozzle communicating with the return port upstream of the check valve, a suction port communicating with the nozzle, a flow passage between the control valve and the nozzle, and a rinse port communicating with the flow passage, said pilot valve including an elongate barrel with front and rear ends, a ported head closing the front end, and longitudinally spaced front and rear pairs of laterally opening ports, a longitudinally shiftable valve member in the barrel normally positioned in the rear portion of the barrel and closing the lateral ports and having an annular flow channel adapted to establish communication between the ports of each pair of ports upon forward longitudinal movement of the valve member in the barrel, a suction line extending between the suction port and one of the rear ports, a brine pipe extending between the other rear port and the brine tank and having a normally open float control valve therein responsive to the level of brine in the tank, and a suction branch pipe connected with and extending between the forward end of the barrel and the suction line, whereby minus pressure is established in the forward end of the barrel to urge the valve member therein forwardly, a rinse pipe connected with and extending between the rinse port and one of the front ports and a rinse line extending between and connected with the other front port and the return pipes, said pilot valve having supplemental valve means to normally check flow through the suction pipe and the rinse pipe and adapted to open when the flow channel in the valve member of the pilot valve is in register with the ports related thereto.

3. A water softener of the character referred to including, an elongate horizontally disposed tubular body, an inlet fitting in the body intermediate its ends, like outlet fittings at the opposite ends of the body and a sodium ion charged filler in the body, a flow control valve having inlet and outlet ports connected with supply and delivery pipes of a water system, outlet and return ports and a drain port, an outlet pipe extending between and connected with the outlet port and the inlet fitting, return pipes extending between and connected with the return port and the outlet fittings, a drain pipe connected with the drain port, said outlet and drain ports and said delivery and return ports being in communication, a shiftable valve member in the valve normally establishing communication between the inlet port and the outlet and drain ports and shutting off communication between the inlet port and the delivery and return ports and shiftable to shut off communication between the inlet port and the outlet and drain ports and establish communication between the inlet port and the return and delivery ports, and a normally closed drain valve in the drain pipe, timing means operatively connected with the drain valve to intermittently open and close the said drain valve and effect operation of the control valve and reversal of flow through the softener, and means for first introducing brine into the softener and subsequently introducing rinse water through the softener when the flow control valve is actuated including, an injector related to the flow control valve, a brine tank, and a pilot valve, said injector including a check valve related to the return port to check reverse flow through said port, a venturi nozzle communicating with the return port upstream of the check valve, a suction port communicating with the nozzle, a flow passage between the control valve and the nozzle, and a rinse port communicating with the flow passage, said pilot valve including an elongate barrel with front and rear ends, a ported head closing the front end and longitudinally spaced front and rear pairs of laterally opening ports, a longitudinally shiftable valve member in the barrel normally positioned in the rear portion of the barrel and closing the lateral ports and having an annular flow channel adapted to establish communication between the ports of each pair of ports upon forward longitudinal movement of the valve member in the barrel, a suction line extending between the suction port and one of the rear ports, a brine pipe extending between the other rear port and the brine tank and having a normally open float control valve therein responsive to the level of brine in the tank, and a suction branch pipe connected with and extending between the forward end of the barrel and the suction line, whereby minus pressure is established in the forward end of the barrel to urge the valve member therein forwardly, a rinse pipe connected with and extending between the rinse port and one of the front ports and a rinse line extending between and connected with the other front port and the return pipes, and means related to the valve member of the pilot valve to limit the rate of travel of said member in the barrel.

4. A water softener of the character referred to including, an elongate horizontally disposed tubular body, an inlet fitting in the body intermediate its ends, like outlet fittings at the opposite ends of the body and a sodium ion charged filler in the body, a flow control valve having inlet and outlet ports connected with supply and delivery pipes of a water system, outlet and return ports and a drain port, an outlet pipe extending between and connected with the outlet port and the inlet fitting, return pipes extending between and connected with the return port and the outlet fittings, a drain pipe connected with the drain port, said outlet and drain ports and said delivery and return ports being in communication, a shiftable valve member in the valve normally establishing communication between the inlet port and the outlet and drain ports and shutting off communication between the inlet port and the delivery and return ports and shiftable to shut off communication between the inlet port and the outlet and drain ports and establish communication between the inlet port and the return and delivery ports, and a normally closed drain valve in the drain pipe, timing means operatively connected with the drain valve to intermittently open and close the said drain valve and effect operation of the control valve and reversal of flow through the softener, and means for first introducing brine into the softener and subsequently introducing rinse water through the softener when the flow control valve is actuated including, an injector related to the flow control valve, a brine tank, and a pilot valve, said injector including a check valve related to the return port to check reverse flow through said port, a venturi nozzle communicating with the return port upstream of the check valve, a suction port communicating with the nozzle, a flow passage between the control valve and the nozzle, and a rinse port communicating with the flow passage, said pilot valve including an elongate barrel with front and rear ends, a ported head closing the front end, and longitudinally spaced front and rear pairs of laterally opening ports, a longitudinally shiftable valve member in the barrel normally positioned in the rear portion of the barrel and closing the lateral ports and having an annular flow channel adapted to establish communication between the ports of each pair of ports upon forward longitudinal movement of the valve member in the barrel, a suction line extending between the suction port and one of the rear ports, a brine pipe extending between the other rear port and the brine tank and having a normally open float control valve therein responsive to the level of brine in the tank, and a suction branch pipe connected with and extending between the forward end of the barrel and the suction line, whereby minus pressure is established in the forward end of the barrel to urge the valve member therein forwardly, a rinse pipe connected with and extending between the rinse port and one of the front ports and a rinse line extending between and connected with the other front port and the return pipes, said pilot valve having supplemental valve means to normally check flow through the suction pipe and the rinse pipe and adapted to open when the flow channel in the valve member of the pilot valve is in register with the ports related thereto, and means related to the valve member of the pilot valve to limit the rate of travel of said member in the barrel.

References Cited in the file of this patent

UNITED STATES PATENTS

| | | |
|---|---|---|
| 529,471 | Arendell | Nov. 20, 1894 |
| 1,942,807 | Dotterweich | Jan. 9, 1934 |
| 2,299,246 | Moore | Oct. 20, 1942 |
| 2,354,694 | McGill et al. | Aug. 1, 1944 |
| 2,751,347 | Miller | June 19, 1956 |
| 2,845,119 | Gugeler | July 29, 1958 |
| 2,855,944 | Albin | Oct. 14, 1958 |